US010123396B2

United States Patent
Jeremy et al.

(10) Patent No.: US 10,123,396 B2
(45) Date of Patent: Nov. 6, 2018

(54) SYSTEM FOR DISPLAYING INFORMATION ON INTERACTIVE ILLUMINATED APPAREL AND ACCESSORIES

(71) Applicant: Lumenus, LLC, Los Angeles, CA (US)

(72) Inventors: Wall Jeremy, Los Angeles, CA (US); Krissman Charles, Los Angeles, CA (US); Gugliuzza Charlie, Ladera Ranch, CA (US)

(73) Assignee: Lumenus, LLC, Los Angeles, CA (US)

(*) Notice: Subject to any disclaimer, the term of this patent is extended or adjusted under 35 U.S.C. 154(b) by 0 days.

(21) Appl. No.: 15/248,804

(22) Filed: Aug. 26, 2016

(65) Prior Publication Data

US 2017/0181255 A1 Jun. 22, 2017

Related U.S. Application Data

(60) Provisional application No. 62/211,468, filed on Aug. 28, 2015.

(51) Int. Cl.

| | |
|---|---|
| *F21V 21/08* | (2006.01) |
| *H05B 37/02* | (2006.01) |
| *A41D 1/00* | (2018.01) |
| *H05B 33/08* | (2006.01) |
| *F21V 33/00* | (2006.01) |
| *B60Q 1/26* | (2006.01) |
| *G09F 21/02* | (2006.01) |
| *F21Y 115/10* | (2016.01) |
| *F21Y 103/10* | (2016.01) |
| *F21W 111/10* | (2006.01) |
| *G06F 3/01* | (2006.01) |
| *A41D 13/01* | (2006.01) |

(52) U.S. Cl.
CPC ........ *H05B 37/0272* (2013.01); *A41D 1/002* (2013.01); *B60Q 1/2673* (2013.01); *F21V 33/0008* (2013.01); *G09F 21/02* (2013.01); *H05B 33/0842* (2013.01); *A41D 13/01* (2013.01); *F21W 2111/10* (2013.01); *F21Y 2103/10* (2016.08); *F21Y 2115/10* (2016.08); *G06F 3/011* (2013.01); *G06F 3/012* (2013.01); *G06F 3/014* (2013.01); *G09F 2021/023* (2013.01)

(58) Field of Classification Search
CPC .......... G06F 3/011; G06F 3/012; G06F 3/014
USPC .......... 362/103, 104, 105, 106, 108; 455/39
See application file for complete search history.

(56) References Cited

U.S. PATENT DOCUMENTS

| | | | | |
|---|---|---|---|---|
| 8,892,220 | B2* | 11/2014 | Kotb | .................. H05B 37/0272 362/103 |
| 2013/0169420 | A1* | 7/2013 | Blount, Jr. | .............. G06F 3/014 340/12.5 |

(Continued)

*Primary Examiner* — Thuy Vinh Tran
(74) *Attorney, Agent, or Firm* — Tsircou Law, P.C.

(57) ABSTRACT

A system for displaying symbols, signals, or other information through light sources that are incorporated into the material of wearables, i.e., apparel or accessories. LEDs are incorporated into a garment to which a controller is attached to control the LEDs, and a battery is attached to power the electronic components. The garment is programmed with different patterns that can provide information to the wearer or to others, and is connected to a device, such as a cellular telephone, smartwatch, or activity band, that the wearer can use to control the light sources embedded in the garment.

20 Claims, 12 Drawing Sheets

(56) References Cited

U.S. PATENT DOCUMENTS

2014/0070957 A1* 3/2014 Longinotti-Buitoni ............... A61B 5/6804 340/870.01
2015/0016093 A1* 1/2015 Wilson ............... A41D 19/0024 362/103
2017/0003356 A1* 1/2017 Kaib ............... G01R 31/3679

* cited by examiner

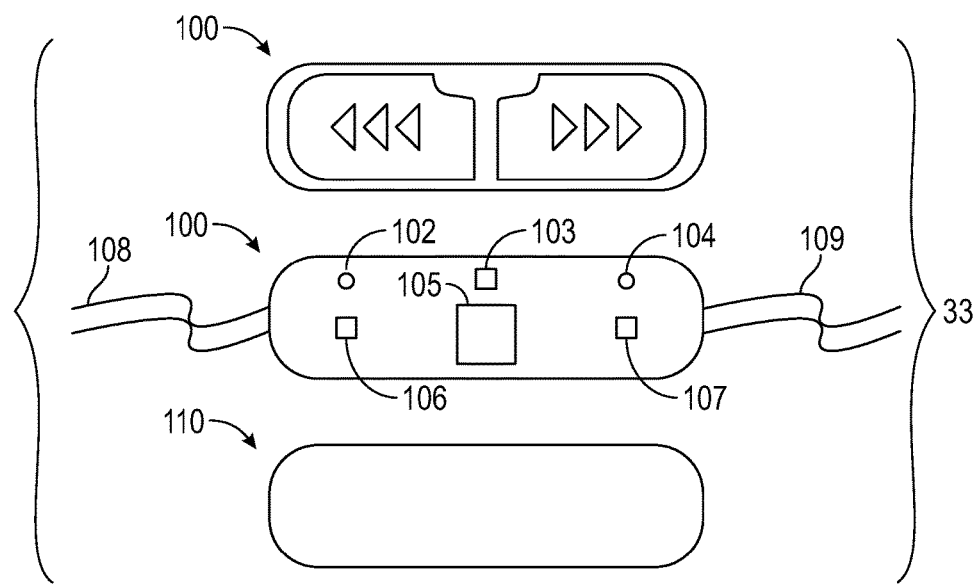
FIG. 14
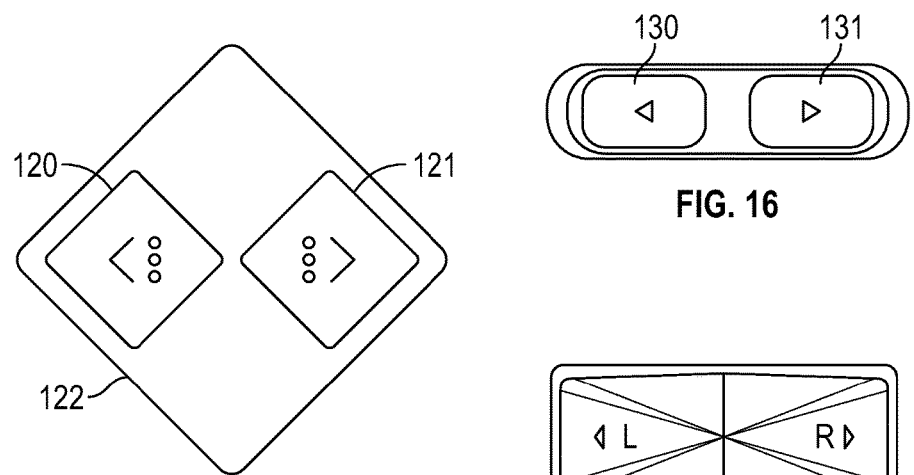
FIG. 15
FIG. 16
FIG. 17

SYSTEM FOR DISPLAYING INFORMATION ON INTERACTIVE ILLUMINATED APPAREL AND ACCESSORIES

CROSS REFERENCE TO RELATED APPLICATION

This application claims the benefit of U.S. Provisional App. No. 62/211,468, filed Aug. 28, 2015, which is incorporated by reference.

FIELD OF THE INVENTION

The present invention relates generally to illuminated apparel and accessories, and more particularly to a system of displaying colors, symbols, signals, or other information on illuminated apparel and accessories using input received from the wearer or from a software application.

BACKGROUND OF THE INVENTION

Illuminated apparel and accessories have not been as widely adopted as other forms of wearable technology, perhaps because few technological advances have been made with which to give wearers meaningful uses for such items.

Present examples of illuminated apparel or accessories include shirts or neckties that display patterns of light in response to sensory input, but this interactivity is limited almost solely to entertainment or decorative purposes. Although shirts that display different intensities of light emitting diodes ("LEDs") depending on the intensity of ambient sounds, or neckties with electroluminescent ("EL") wires that display different-colored lights at the flip of a switch, certainly make for interesting clothing, these examples do not provide many functional uses.

The examples of illuminated apparel or accessories that are more practical than decorative still tend to be quite limited in their functionality. Several examples exist specifically for riders of two-wheeled motorized vehicles, such as a helmet with a brake light built into the rear panel, or apparel with turn indicating lights. Many of these examples must be synchronized in some manner with a vehicle's electronic systems, and thus cannot be used for non-motorized or non-electronic forms of transportation such as bicycling, skateboarding, or walking. Other of these examples have an integrated controller that must be operated manually by the wearer, which can distract the wearer and thus diminish overall safety. Furthermore, these examples do not integrate with devices external to the apparel or accessories in order to both send and receive information.

Additional examples of illuminated apparel and accessories that may be practical, but of limited functionality, include illuminated vests or headbands that can be used to make motorists aware of joggers, construction workers, or bicyclists, in order to prevent collisions. Similarly, illuminated gloves can be used for bicyclists or horseback riders to help them make turn indicating signals to motorists to communicate their intentions. These examples, however, as with the examples for two-wheeled motorized vehicles described above, are intended to transmit light to people other than the wearer, and thus do not provide useful information to the wearer.

It should, therefore, be appreciated that there remains a need for interactive illuminated apparel and accessories that fulfill these needs and others.

SUMMARY OF THE INVENTION

Briefly, and in general terms, the invention comprises a system for displaying symbols, signals, or other information through light sources that are incorporated into the material of apparel or accessories ("wearables").

More specifically, in an exemplary embodiment, LEDs are incorporated into a garment or accessory, such as a shirt, to which a controller is attached to control the LEDs, and a battery is attached to power the electronic components.

In a detailed aspect of an exemplary embodiment, LEDs and controllers in the illuminated shirt are waterproofed, and the battery is removable, which allows the shirt to be washable.

In another detailed aspect of an exemplary embodiment, the shirt can be programmed with different patterns that can provide information to the wearer or to others, such as a pulsing pattern that informs a jogging wearer of an optimum footfall cadence, or a blinking pattern that informs motorists of a bicycling wearer's position at night.

In another detailed aspect of an exemplary embodiment, a controller incorporated in the shirt is designed to connect with a device, such as a cellular telephone, smartwatch, or activity band, that the wearer can use to control the lights embedded in the shirt. Additionally or alternatively, a software application ("app") may be executed on the connected device in order to receive information from the illuminated shirt, or to send information to the shirt to control the embedded lights, with or without direct user input.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 14 is an exploded top view of a controller for illuminated apparel or accessories, depicting a topmost layer on which is situated an interface for the wearer to press buttons to control the embedded lights, and a second layer on which is situated a button assembly, small indicator lights, a wireless transmitter and receiver, and an integrated circuit that may be used to pair the device with an accessory or to manually control the lighting.

FIG. 15 is a top view of an alternate interface layer that could be placed on top of a controller assembly as depicted in FIG. 14.

FIG. 16 is a top view of another interface that could be placed on a controller assembly as depicted in FIG. 14.

FIG. 17 is a top view of yet another interface that could be placed on a controller assembly as depicted in FIG. 14.

DETAILED DESCRIPTION OF THE PREFERRED EMBODIMENTS

Figure 1:
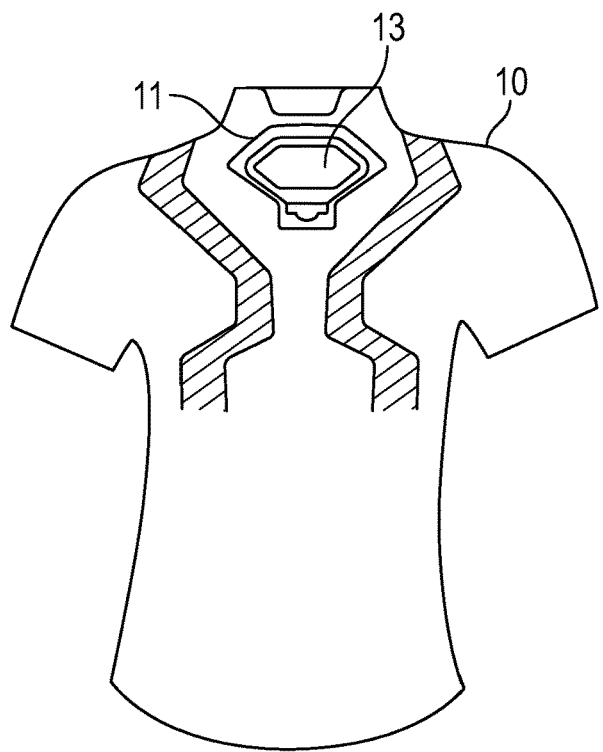
FIG. 1 is a rear view of an illuminated shirt in accordance with the present invention, depicting two strips of lights and a receptacle for an electronics package consisting of a controller to manage the lights, or a battery to power the lights, or both.
Figure 3:
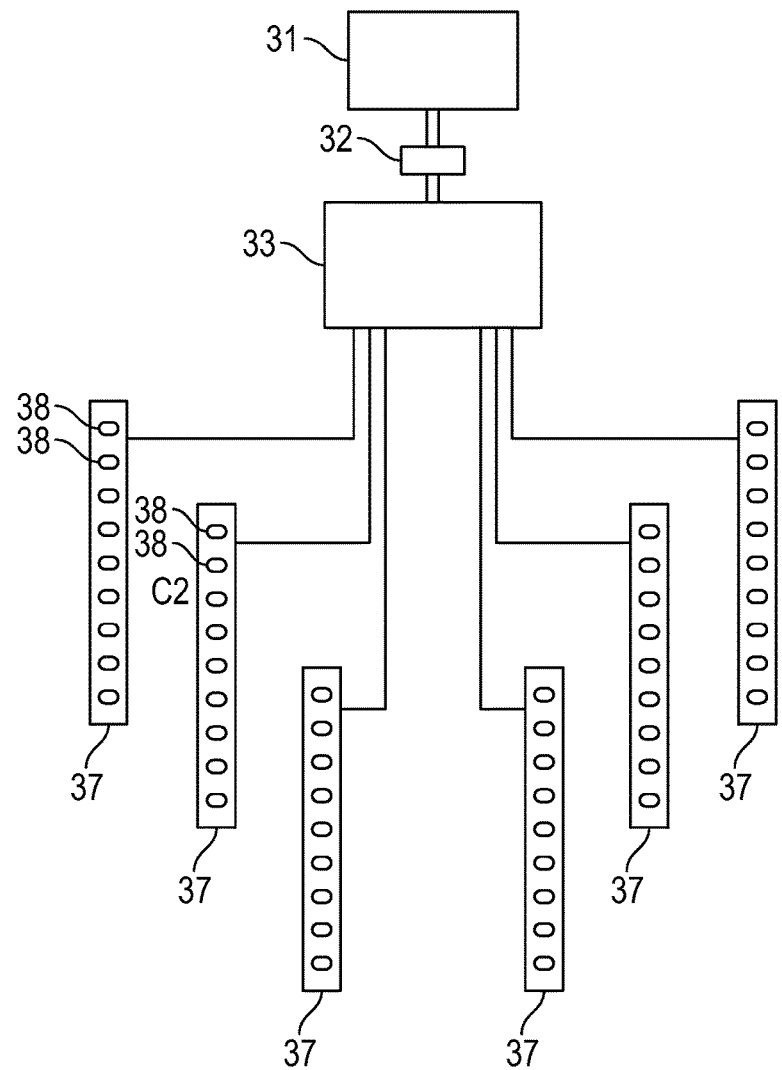
FIG. 3 is a block diagram of electrical components that power and control the lights that have been incorporated into the illuminated apparel or accessories.
Figure 4:
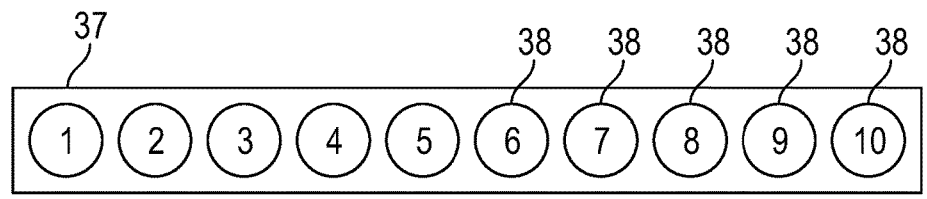
FIG. 4 is a detailed block diagram of part of the diagram depicted in FIG. 3, specifically showing a group of lights that are controlled and powered by the system depicted in FIG. 3.

Referring now to the drawings, and particularly FIG. 1, there is shown an article of apparel 10 with patches of lights 12 sewn into the fabric of the apparel 10. The article of apparel 10 is shown to be a shirt for the purposes of this embodiment; however, any wearable such as jackets or pants, or a hat or bag, may be used with the system singularly or in combination. The light patches in this embodiment are comprised of a series of individual LEDs 38, best seen in FIG. 4, which are connected to a strip 37. Multiple strips 37 are connected to a controller 33, best seen in FIG. 3. The controller 33 connects to a battery 31 by means of a connector assembly 32.

A hexagonal housing 13 (FIG. 1) for the battery 31 is also attached to the fabric of the shirt 10 with a matching hexagonal receptacle 11 into which the housing 13 snaps in order to both secure the battery 31 to the shirt 10 and to allow the battery housing 13 to be removed for washing of the shirt 10.

Other embodiments incorporate a controller 33 into the housing 13, along with or instead of a battery 31, to form an electronics package ("package"). Such a configuration enables the controller 33 to be removed for washing of the shirt 10. The package need not be removable in order to make the apparel or accessory washable if other means of waterproofing are used, and an embodiment may thus make waterproof a controller 33 and battery 31 to allow the apparel or accessory to be washed without needing to remove any electronics package. Furthermore, the illuminated apparel or accessory need not be washable, especially if it is designed to be disposable, but washing allows for repeated wears of the apparel or accessory when the wearer is engaging in activities that may involve sweat or dirt or water. The various removable package housings discussed below, however, are intended to contain a battery.

Figure 5:
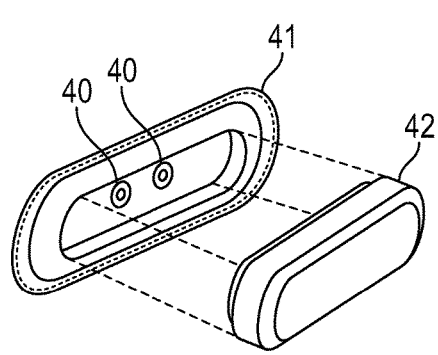
FIG. 5 is a perspective view of an electronics package ("package") that houses a battery, and a conductive receptacle that would be incorporated into the illuminated apparel or accessories, into which the package would snap to fix it in place.

A different version of a receptacle and battery combination, best seen in FIG. 5, involves the use of two battery contacts 40 located inside an oval-shaped receptacle 41, into which a battery in a matching oval-shaped housing 42 is designed to snap. The receptacle 41 would be sewn or otherwise attached to the fabric of the shirt 10. Once the battery housing 42 is snapped into the oval-shaped receptacle 41, the battery contacts 40 complete a circuit with the battery in the oval-shaped housing 42 to power the requisite electronic components of the illuminated apparel or accessory.

Figure 2A:
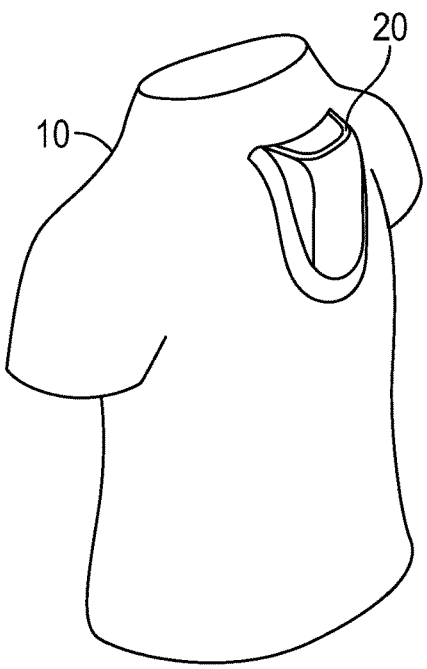
FIG. 2A is a perspective rear view of an illuminated shirt, similar to the one depicted in FIG. 1, but with a pouch receptacle for an electronics package, depicting three-dimensional depth as it would be worn by a person.
Figure 6:
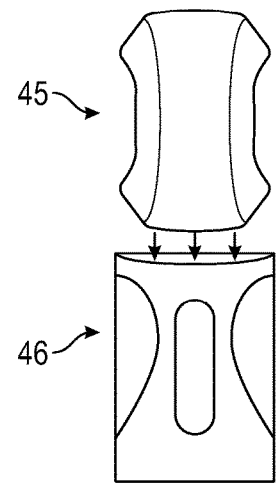
FIG. 6 is a front view of another means of securing the package by sliding it into a pocket or pouch incorporated into the illuminated apparel or accessories.

The receptacle may alternatively be constructed with any means for securing an electronics package, containing a battery, controller, or otherwise, while still allowing the package to be removed. The first of these possible alternative receptacles, seen in FIG. 2A, is a pocket 20, which is sewn onto the back of the shirt 10. A battery can be inserted into or removed from this pouch 20, with the similar intention of making the battery secure but removable. FIG. 6 shows in better detail one possible design for this pouch and battery combination, with a multi-faceted battery housing 45 designed to be inserted securely into a matching pouch receptacle 46, which would be attached to the fabric of the shirt 10.

Figure 7:
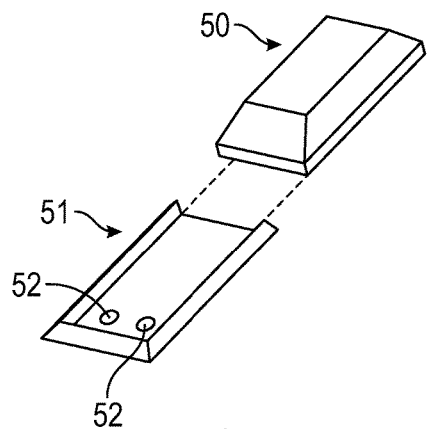
FIG. 7 is a perspective view of another means of securing the package by sliding it into a conductive track, which would be incorporated into the illuminated apparel or accessories.

Another alternative receptacle 51, seen in FIG. 7, utilizes tracks into and out of which a slotted battery housing 50 can slide. This receptacle 51 has two battery contacts 52 located at the end of the tracks, with which the battery housing 50 will connect when the housing 50 is fully inserted into the receptacle 51, thereby completing a circuit to power the illuminated apparel or accessory.

Figure 8:
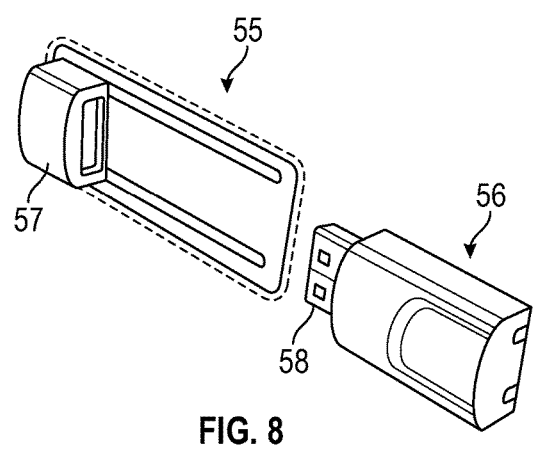
FIG. 8 is a perspective view of yet another means of securing the package, by both sliding the package into a track that would be incorporated into the illuminated material, at the end of which might be a receptacle similar to a universal serial bus ("USB") port to accept a matching plug on the package.
Figure 29:
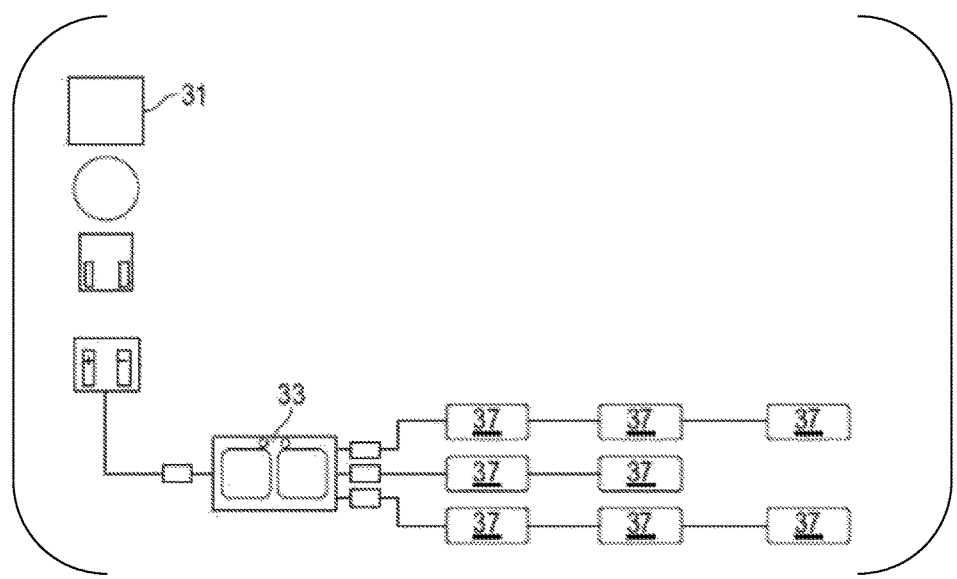
FIG. 29 is simplified diagram of an embodiment of a battery, receptacle and illumination strips in accordance with the invention.

Similarly, FIG. 8 shows an alternative receptacle 55 with tracks, into which a different slotted battery housing 56 will slide. This slotted battery housing 56, however, has a plug 58 similar to a universal serial bus ("USB") plug instead of battery contacts, which fits into a matching socket 57 located at the end of the receptacle's 55 tracks. Similar to the combination of a USB plug and USB socket, this plug 58 and socket 57 would assist in the securing of the battery housing 56 based on the friction between the plug 58 and socket 57. Another embodiment of a battery and receptacle combination using a USB connector can be seen in greater detail in FIG. 29.

Figure 2B:
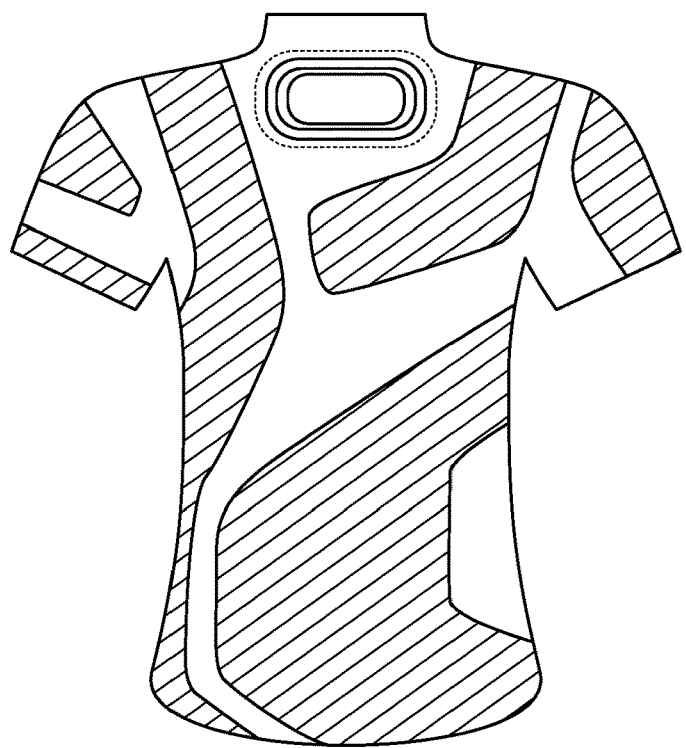
FIGS. 2B-2C are additional variations on an illuminated shirt and pouch receptacle for an electronics package.
Figure 2C:
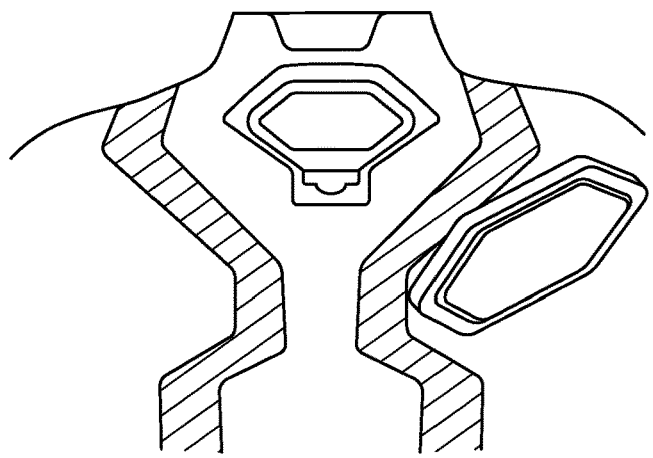
Figure 9:
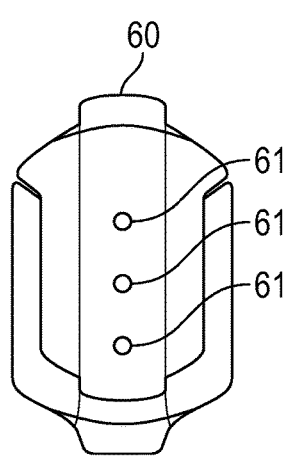
FIG. 9 is a front view of one possible facade for an electronics package housing that includes three lights to inform the user of the remaining battery, the system status, or other information.
Figure 10:
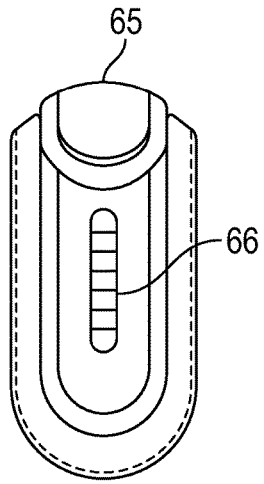
FIG. 10 is a front view of another possible facade for a package housing that includes more lights, which may inform the user of remaining battery or possibly more complex information.
Figure 11:
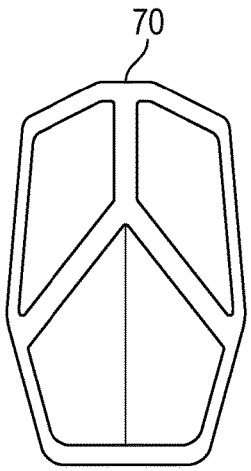
FIG. 11 is a front view of a facade for a housing that may be used without indicator lights, or with a different lighting scheme altogether.
Figure 12:
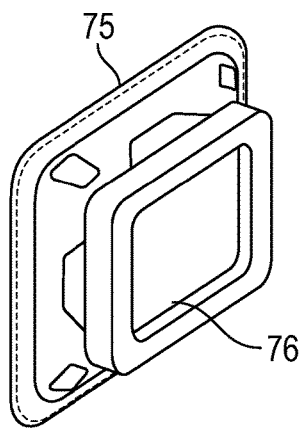
FIG. 12 is a perspective front view of a package housing with a less contoured surface, on which text, a logo, or other information could be printed, or on which a small screen or other electronic device could be mounted.
Figure 13:
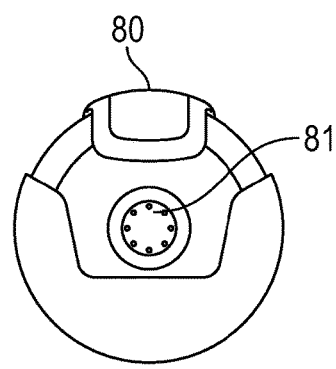
FIG. 13 is a front view of a different facade for a housing that includes a small opening into which could be situated one or a number of lights to display information to the wearer, or into which a button could be placed.

Battery housings can utilize decorative or functional facades. FIGS. 9 through 13 show different possible facades for battery housings, any of which could potentially be used with any of the types of receptacles described above. FIG. 9 depicts a battery housing 60, which could be plugged, slid, or otherwise inserted into a receptacle affixed to the apparel or accessory, such as the hexagonal receptacle 11 in FIG. 1 or the pouch receptacle 20 in FIG. 2. This battery housing 60 also has on it three LEDs 61 which can be used to convey information to the wearer, such as whether the illuminated apparel or accessory is on or whether the wearer needs to recharge the battery. FIG. 10 depicts a similar battery housing 65, which also has an indicator 66 on the front of the facade. This indicator 66 as depicted consists of a series of LEDs in a line, which can convey more detailed information to the wearer, such as how much battery power remains. Alternatively, this indicator 66 could be a small screen or other electronic device to display text or symbols, or could be any means for conveying information to the wearer or interacting with the illuminated apparel or accessory.

A different battery housing facade 70 (FIG. 11) could be employed which utilizes only decorative elements and does not incorporate any indicator like those in FIG. 9 and FIG. 10, although it could be used with a different lighting scheme altogether. Alternatively, a facade 75 (FIG. 12) could incorporate a flat surface 76, on which could be placed a logo or other information, or a receptacle for an electronic device such as a smartphone or smartwatch, or a screen which could convey information to the wearer. Yet another facade 80 (FIG. 13) might have a space 81 for an indicator light or lights, or a screen, or a button, or some combination of elements with which the wearer can obtain information about and interact with the illuminated apparel or accessory.

The controller 33 for this particular embodiment, shown in an exploded-view diagram in FIG. 14, is comprised of a topmost layer 100 made out of silicone, which acts as an interface for the wearer. In this configuration, two buttons are presented on the topmost layer 100. The controller 33 has a second layer 101 with flexible printed circuit ("FPC") on which is laid a sensor for the left button 106, and a sensor for the right button 107. Above the left button 106 is an LED 102 to serve as either a backlight or an indicator light. Similarly, above the right button 107 there is another LED 104. Also on the second layer 101 is an integrated circuit ("IC") 103. This IC may be utilized to control the power, patterns, colors, and intensities of the LEDs 38 (FIG. 3) via the leads to the LEDs 108. The IC 103 also may be responsible for controlling any other input and output of the illuminated apparel or accessory, such as the Bluetooth low energy ("BLE") chip 105 that subsequently is responsible for communicating with other devices that are external to the apparel or accessory, such as the wearer's cell phone. The lights of the apparel or accessory derive power from the battery 31 via the leads to the battery 109. The topmost layer 100 and the second layer 101 are both attached to a third layer 110 and the entire controller 33 is sealed to make it dust-proof and waterproof.

Other interfaces are available for the controller, such as one depicted in FIG. 15 that provides room for two additional buttons in addition to the left 122 and right 121 buttons. The interface can also be designed with different textures in order to provide tactile feedback to the wearer, such as small bumps 120 on each button for the user to distinguish each button from the other. Alternatively, the interface can be sculpted to provide additional textures, such as concave left 130 and right 131 buttons (FIG. 16), or can be made out of different materials such as metal left 140 and right 141 buttons (FIG. 17).

This illuminated apparel and accessories may be used by themselves, such that a wearer utilizes buttons on a controller 33 to activate specific patterns in the embedded lights 12. However, the system was designed to use devices external to the apparel or accessories, such as today's latest cell phones ("smartphones"). Specifically, in a preferred embodiment, the lights are controlled by a software application ("app") that is run on a smartphone, via a wireless connection between the smartphone and the BLE chip 105 (FIG. 14) on the system controller 33.

Use of an app adds advanced functionality to this preferred embodiment of the illuminated apparel or accessory, by enabling the display of meaningful information to the wearer or others. For example, the app may direct the controller to turn on the lights in a particular pattern or color to display information such as speed, heart rate, phone notifications, turn signals, brake lights, and intersection safety warnings. The use of an app also enables the illuminated apparel or accessory to function semi-autonomously, without direct user input. One embodiment of such an app is depicted in part in FIG. 18.

Figure 18:
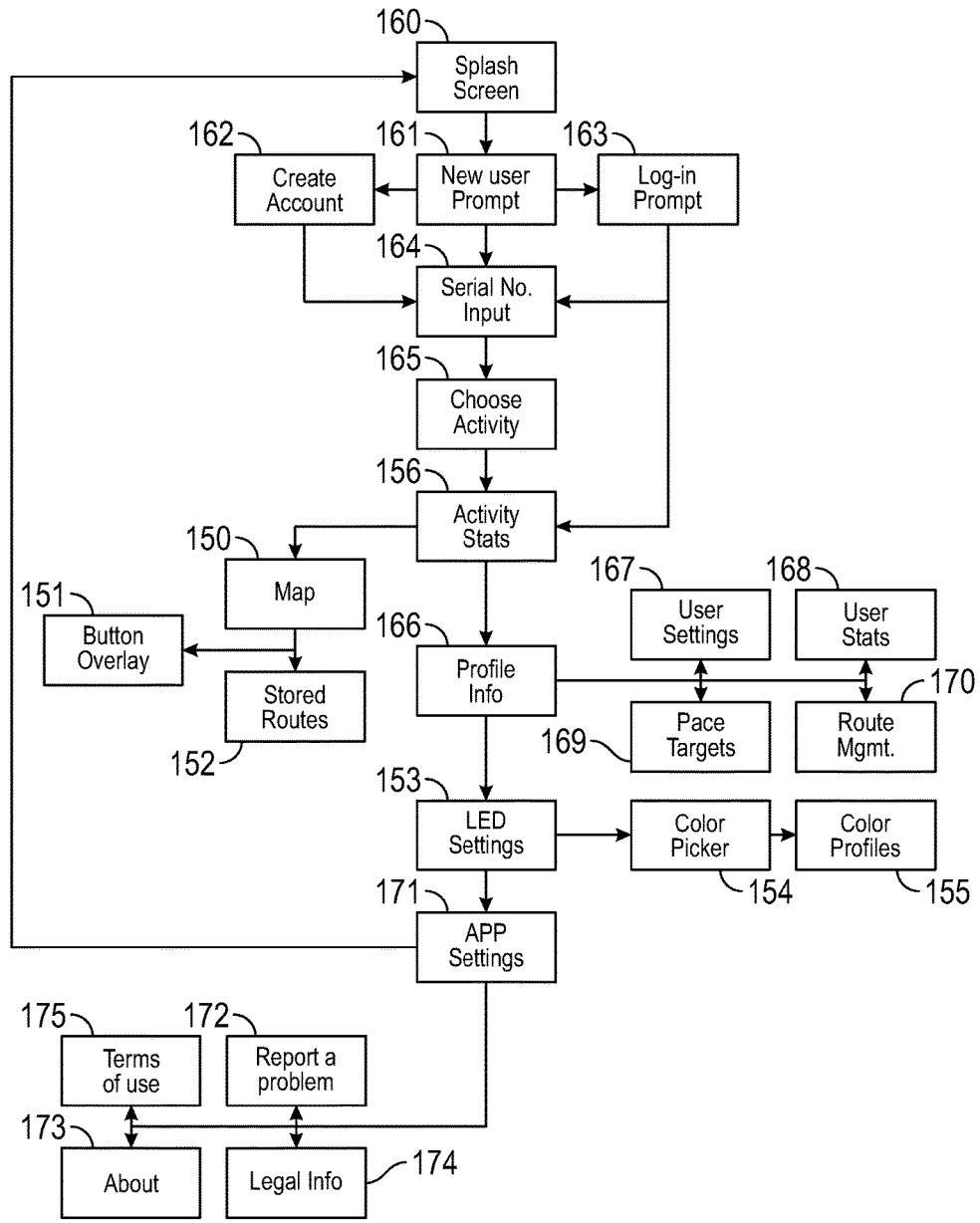
FIG. 18 is a diagram depicting the organization of a software application ("app") to interface with illuminated apparel or accessories.

Upon executing or opening the app in the embodiment depicted in FIG. 18, the user is shown a SPLASH SCREEN 160, for a minimum amount of time, while the requisite processes load. The first time that the app is used, a tutorial is shown to the user immediately after the SPLASH SCREEN 160. Then the NEW USER PROMPT 161 is shown, to allow the user to select whether they would like to register a new user account or to log in to an existing user account. After creating an account or logging in, the user is prompted to input the serial number of the user's illuminated apparel or accessory at the SERIAL NO. INPUT 164 screen.

In this embodiment, the primary use for the illuminated apparel or accessory can be selected at the CHOOSE ACTIVITY 165 screen. The user is then shown the ACTIVITY STATS 156 screen that shows the user's previous activities and allows the user to begin a new activity. For all executions of the app subsequent to the first, this ACTIVITY STATS 156 screen is the first screen shown to logged-in users. Beginning an activity directs the user to different screens for various app functions, depending on the activity.

In one instance of this embodiment, a user who begins a bicycling activity may be shown a MAP 150 screen for recording a new route, or may be shown the STORED ROUTES 152 screen to allow the app to display patterns according to the user's position along stored routes.

Figures 19, 20:
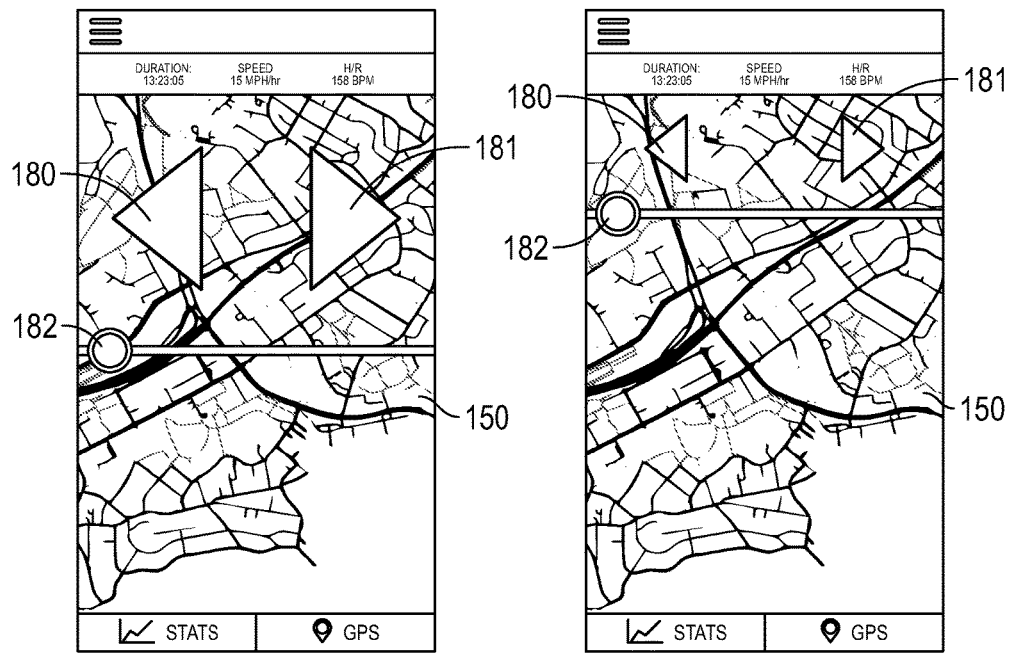
FIGS. 19-20 are screenshots of one feature of the app of FIG. 18, which may be used to interface with illuminated apparel or accessories via a controller or in lieu of a controller.

One feature of this embodiment of the app is a BUTTON OVERLAY 151, which is overlaid on a screen such as the MAP 150 screen to allow the wearer to control the illuminated apparel or accessory to light up with predetermined patterns. This MAP 150 screen and BUTTON OVERLAY 151 are shown more clearly in FIGS. 19-20. The BUTTON OVERLAY 151 includes a left button 180 and a right button 181, similar to the left button 106 and right button 107 found on the hardware controller 33 embedded in connected apparel or accessories. These buttons 180 & 181 are overlaid on the MAP 150. By pressing the right software button 181 on the screen, the app will communicate to the connected apparel or accessories to activate light patterns to indicate that the wearer intends to make a right turn, and the app can then store this information as part of a stored route to obviate user input during subsequent trips on the route. The size and position of the software buttons 180 & 181 on a screen can be manipulated using the software knob 182.

The app can use a smartphone's GPS receiver to track the wearer's current location, and the app can display this position on the MAP 150 screen. Furthermore, as described in part above, the app can determine when the wearer should be making an upcoming turn, as part of a stored route that the wearer is following via the app's STORED ROUTES 152 function (e.g., see FIG. 30). Once the app knows that the wearer is about to make a turn, it can automatically initiate the appropriate turn signal pattern in the light patches 12 on the illuminated shirt 10, serving to inform observers about an impending change of direction, or to inform the wearer of a necessary turn if the route is unfamiliar.

As an example scenario incorporating the shirt embodiment described above, when the app detects via the smartphone's GPS receiver that the wearer is within 40 feet of an intersection, then the app communicates with the connected shirt 10 to display white-colored lights on the patches 12 on the front of the shirt 10, and red-colored lights on patches on the rear of the shirt 10. Alternatively, the app can activate this pattern at all times the wearer is in motion, and change the pattern to flashing white lights on the front and flashing red lights on the rear when the wearer is within 40 feet of an intersection. In this example, the app autonomously activates or deactivates the desired patterns based on the wearer's location along a predefined route, without requiring user input to determine when the patterns should be activated or deactivated (e.g., see FIG. 30). However, in another scenario where the wearer is not moving along a predefined route, the app may receive user input through the app interface, such as by the BUTTON OVERLAY 151 or by saying aloud a particular phrase such as "intersection" or by other means, after which the app communicates with the connected shirt 10 to activate the light pattern for a specific duration such as 10 seconds. In this undefined route scenario, the app may store the wearer's location and input so that the app can autonomously activate the requisite patterns if the wearer chooses to follow the same route in the future.

Figure 27:
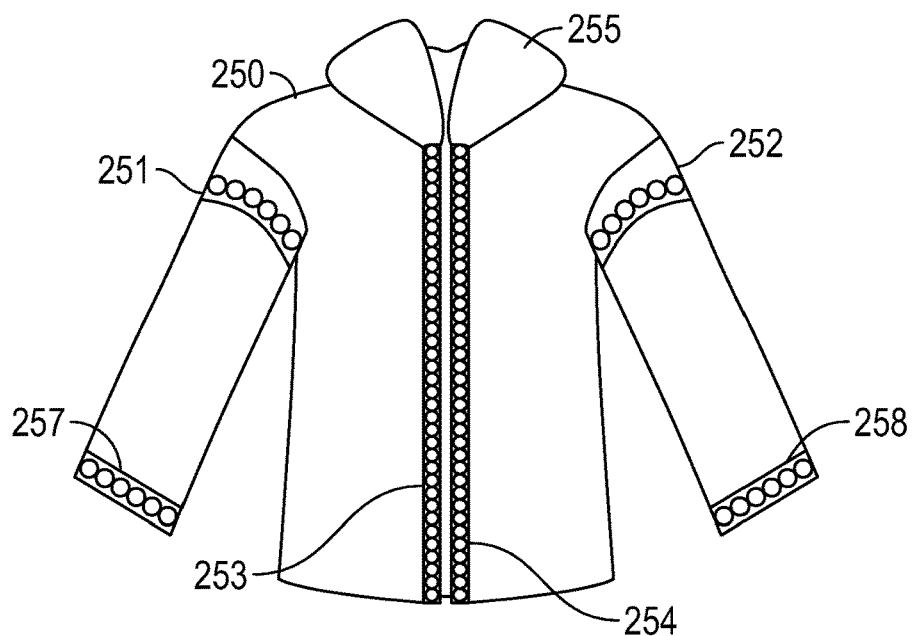
FIG. 27 is a front view of a garment in accordance with the present invention.
Figure 28:
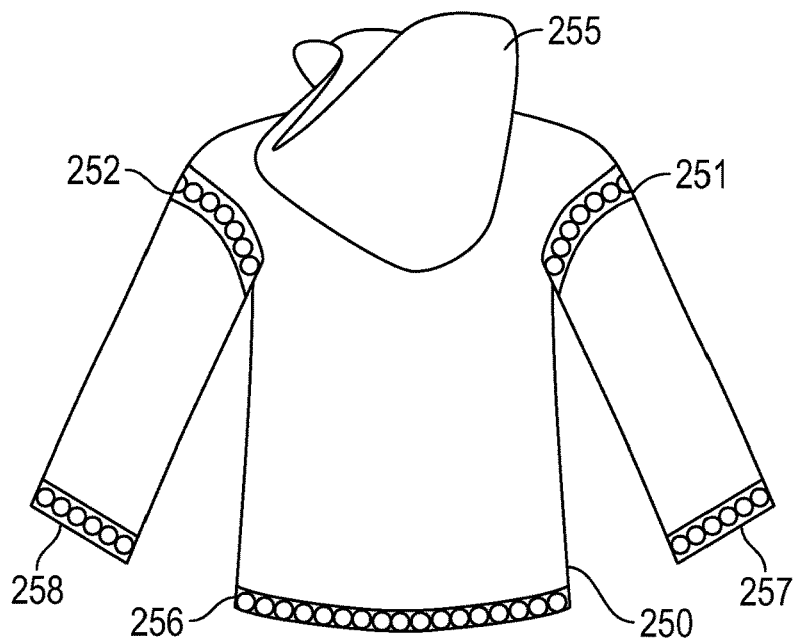
FIG. 28 is a back view of the garment of FIG. 27.
Figure 30:
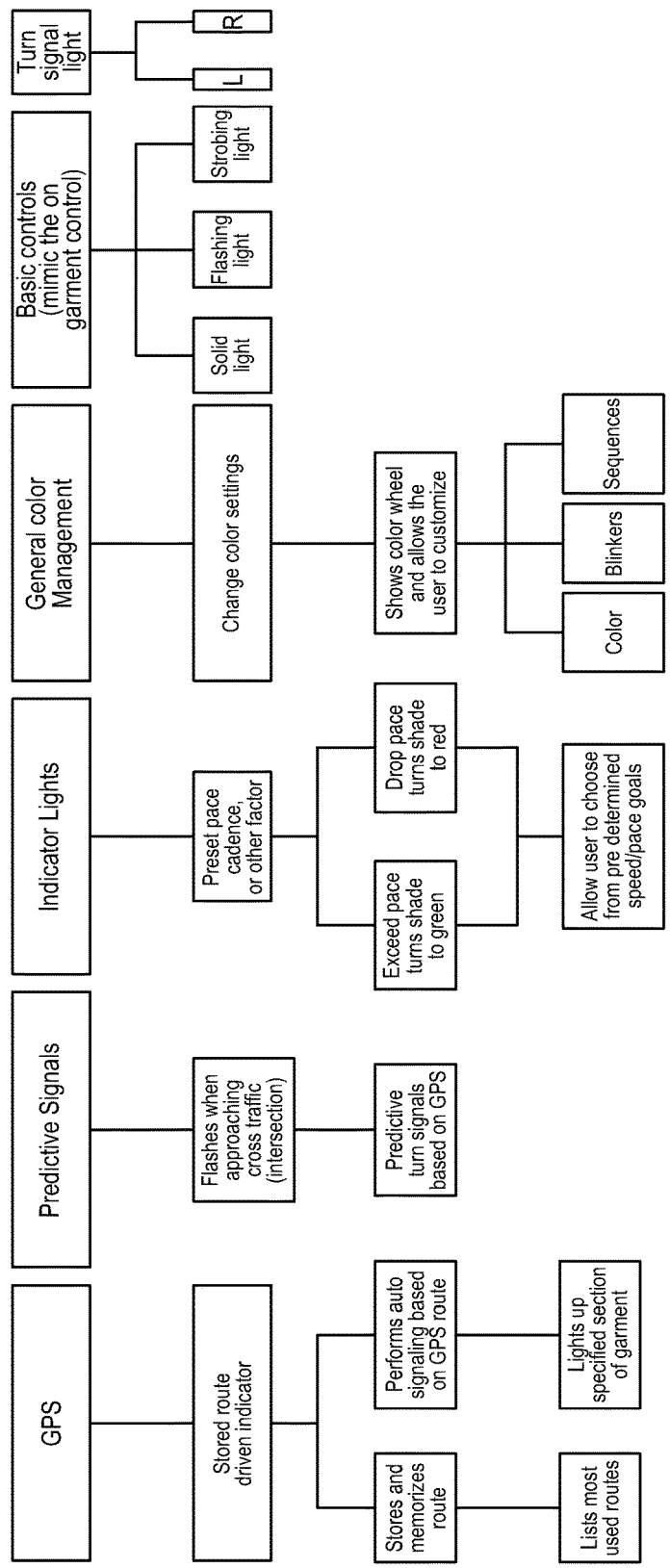
FIG. 30 is a simplified block diagram of subsystems for use in accordance with the invention.

As another example scenario incorporating a jacket embodiment depicted in FIGS. 27-28, when the app detects that the wearer is approaching a left turn required by the wearer's route, the app communicates with the connected jacket 250 to display white-colored lights on the front patches 253 and 254, red-colored lights on the rear patch 256, and flashing yellow-colored lights on the left sleeve 252 (e.g., see FIG. 30). Additionally, lights can be embedded into the hood 255 of the jacket for even greater visibility. The app in this scenario activates this left-turn pattern when the wearer is 100 feet before the turn, and deactivates the pattern once the wearer has moved 20 feet past the turn.

As another example involving an illuminated jacket 250 and an illuminated backpack, the app implements a braking scenario when the wearer decelerates. In this scenario, when the app detects that the wearer's speed is reduced by a certain percentage such as 30% within a certain period such as 2 seconds, the app will communicate with the connected jacket 250 to display red on the right sleeve light patch 251 and on the left sleeve light patch 252 and on the rear light patch 256, and simultaneously communicate with the connected backpack to display red on light patches embedded in the backpack.

Figure 24:
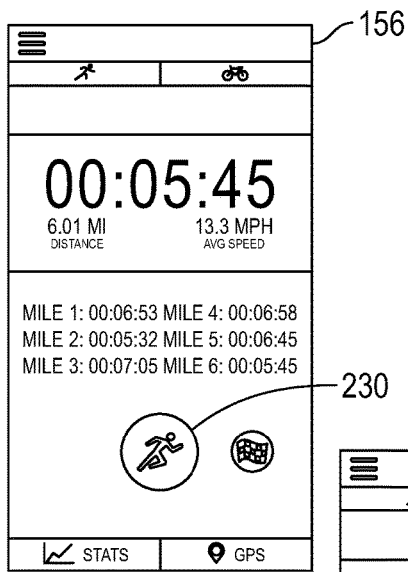
FIGS. 24-26 are screenshots of another feature of the app of FIG. 18, which may be used to track a wearer's speed and time in order to allow the wearer to manage her pace.
Figure 25:
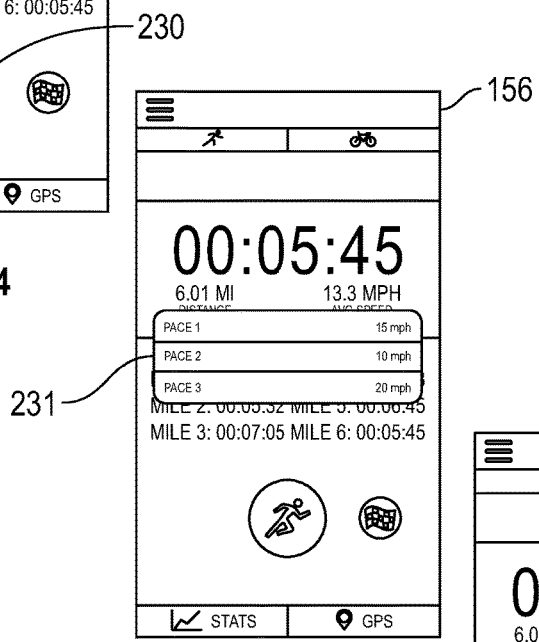
Figure 26:
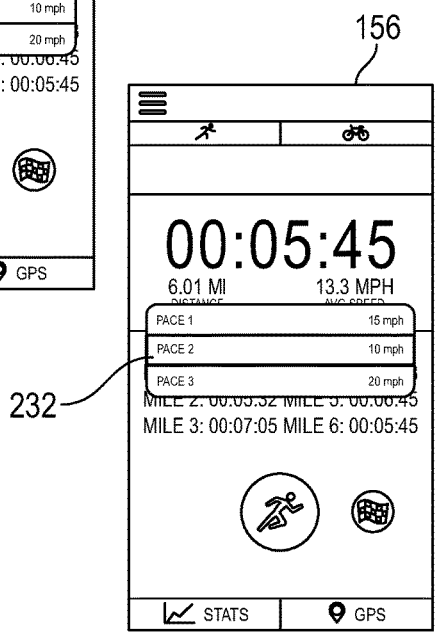

Along with determining the wearer's location using a GPS receiver, the app also has the capability to determine the wearer's pace. FIG. 24 depicts a software button 230 on the ACTIVITY STATS screen 156, with which the wearer can input a desired pace in the resulting menu 231 that pops up. By selecting a pace 232, and by being able to determine the wearer's actual pace, the app can automatically change the color and pattern of the LEDs 38 in the system to inform the wearer if their pace is too slow, too fast, or just right (e.g., see FIG. 30). For example, a patch of lights 12 sewn into an illuminated shirt 10 sleeve can be made to slowly flash green if the wearer is within 10% of her selected pace, but the app could change the lights to rapidly flash red if the wearer begins to move more than 10% faster than her selected pace. As another example, if the wearer's speed falls below 25% of the selected pace, then the app will display yellow on the right cuff light patch 257 of an illuminated jacket 250, while displaying white on the left cuff 258, right shoulder 251, left shoulder 252, and front patches 253 and 254, and displaying red on the rear patch 256.

Figures 21, 22, 23:
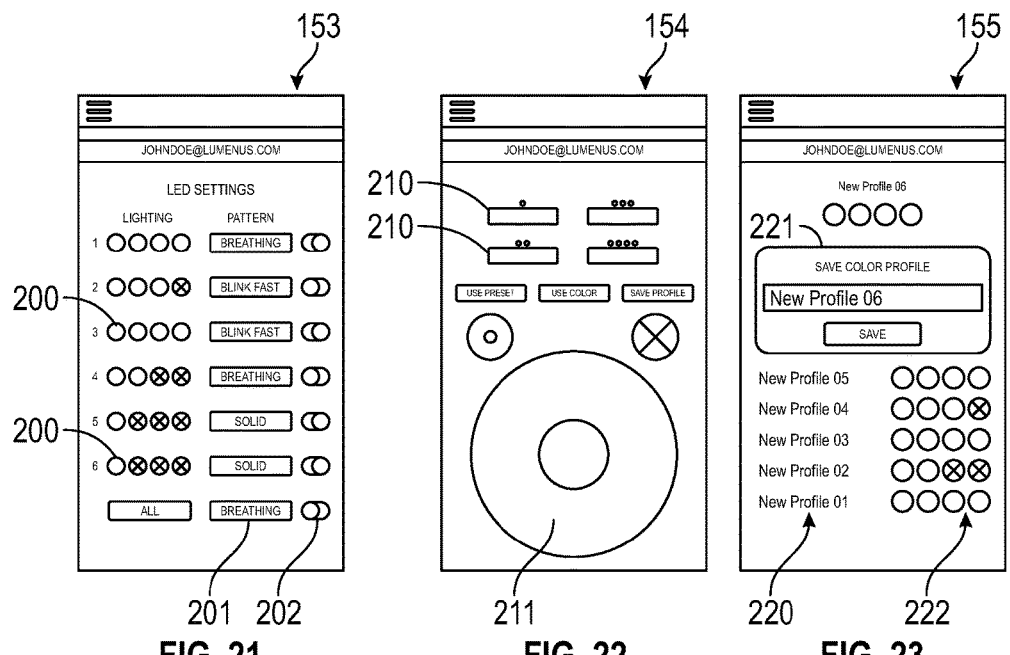
FIGS. 21-23 are screenshots of another feature of the app of FIG. 18, which may be used to manage lighting color schemes for illuminated apparel or accessories.

The app also has an interface, which can be used to control the appearance of the apparel or accessory. The COLOR PICKER screen 154, best shown in FIG. 22, allows the wearer to select any desired color for the LEDs 38 on the shirt 10 using the software color dial 211. The wearer can save these desired colors as presets 210, which can be saved together as a particular color profile 220 in the COLOR PROFILES screen 155, best seen in FIG. 23. The COLOR PROFILES screen 155 allows the wearer to quickly see the names 220 and colors 222 which are associated with her saved color profiles, and to save new color profiles which were created using the color wheel 211 and color presets 210 which were utilized on the COLOR PICKER screen 154, using the input dialog 221 on the COLOR PROFILES screen 155 (e.g., see FIG. 30). Once the color profiles 220 are set up, the wearer can then use the color profiles to change the lights on her shirt in the desired colors and patterns using the LED SETTINGS screen 153, best depicted in FIG. 21. On this screen 153, the wearer can see the color profiles 220 in a list 200, and can choose how she wants those colors displayed using an option button 201, before turning the pattern 220 on or off using a slider button 202. Through this LED SETTINGS screen 153, the user may control how the lights are displayed, such as by fast blinking, slow blinking, or solid (i.e., no blinking) patterns, or by other more complex patterns like a "breathing" or pulsating pattern or like a "trickle" or sequential motion pattern.

A wearer can use these color profiles 220 to convey any range of information. For example, a bicyclist could use the app to activate an alternating red-blue pattern on his left cuff 258 whenever he receives an incoming telephone call from a particular person such as his mother, such that he would know who is calling just by seeing the flashing red and blue, without having to pull to the side of the road and stop to check his cell phone. Similarly, the app could display a flash of purple light on the underside of the bill of an illuminated baseball cap, to notify the wearer of an incoming text message. Additionally or alternatively, the app could make the illuminated apparel or accessory pulse at a specific number of beats per minute, to inform the wearer when her footfalls should be hitting according to the ideal pace she has selected. The app could also strobe with different colors at different rates, depending on the wearer's location and the current time of day or current weather, in order to best increase the visibility of the wearer. For example, the app could activate a fast white strobing pattern if it determined that the wearer was bicycling through rain, but if the app determined that the rain had changed to snow, it could change the pattern to a slow red pulse, since white light might not be as visible in snowfall.

The app as shown in FIG. 18 also allows a logged-in user to save and edit their personal information and preferences, through the PROFILE INFO 166 and subsequent screens. For example, the user can use the USER SETTINGS 167 screen, accessible via the PROFILE INFO 166 screen, to input biographical and personal information. Through the USER STATS 168 screen, the user can see detailed statistics about completed activities, such as the average amount of miles that were ran each week, or the total hours that have been bicycled while using the app. Through the PACE TARGETS 169 screen, the user can set ideal paces for the app to control the illuminated apparel or accessories as described above. Through the ROUTE MGMT 170 screen, the user can add or edit predefined routes for the app to control the illuminated apparel or accessories as described above.

The app in this embodiment also includes an APP SETTINGS 171 screen through which the user can manage the app's software settings such as the units of measurement to be displayed (e.g., miles or kilometers). The app can also collect and display important information through screens subsequent to the APP SETTINGS 171 screen. For example, the app will submit an error report with user input through the REPORT A PROBLEM 172 screen, or the app will display information about the system through the ABOUT 173 screen. Additionally, the app in this embodiment can display the app's LEGAL INFO 174 or TERMS OF USE 175.

The illuminated apparel or accessory system may be applied to various industrial or enterprise scenarios, and a user interface or app can be customized to meet each specific scenario. This customizability has specific value for police officers, fire fighters, airport workers, construction workers, and any person in a setting where increased visibility creates increased safety. Particular light colors, intensities, and patterns may provide optimal visibility in varying conditions or times of day. Furthermore, observers react differently based upon flashing frequencies, colors, intensities, and patterns of light. Thus, illuminated apparel or accessories can be tailored for optimal visibility using these visibility conditions and reactions to automatically modify illuminated apparel or accessories based upon variables such as the wearer's location, speed, direction of movement, the time of day, or the local weather conditions. In addition to the functionality described above, modifications may be incorporated into the illuminated fabric, controller, app, or other parts of the illuminated apparel or accessory system, in order to meet particular requirements or needs on a case-by-cases basis.

It should be appreciated from the foregoing that the present invention provides a user with uniquely functional systems of interacting with articles of illuminated apparel and accessories, as well as robust methods of controlling the illumination thereon, which can display colors, symbols, signals, or other information on the wearer.

The present invention has been described above in terms of presently preferred embodiments so that an understanding of the present invention can be conveyed. However, there are other embodiments not specifically described herein for which the present invention is applicable. Therefore, these embodiments should be considered illustrative rather than restrictive, and the present invention is not to be limited to the forms shown. Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A system for displaying information through light sources comprising:
   a wearable;
   light sources disposed on the wearable;
   a controller in communication with said light sources, the controller varies illuminating schemes for the light sources based on positional data, providing location, speed, and direction of movement of a wearer relative to map data;
   and a battery attached to said controller.

2. The system of claim 1, wherein the controller is in digital communication with a GPS receiver that is used to track the positional data.

3. The system of claim 1, wherein the light sources are controlled by an application that is run on an external device in wireless communication with the controller.

4. The system of claim 3, wherein the external device is a smartphone, such that the light sources are activated to convey information about calls and texts received by the smartphone.

5. The system of claim 3, wherein said application stores user data for computing information.

6. The system of claim 1, wherein the map data includes travel routes and intersection locations.

7. The system of claim 6, wherein the controller varies the illuminating schemes of the light sources based on a predetermined travel route compared to the positional data, such that the illuminating schemes 1) convey directions to the wearer and 2) convey predicted directional signals to others, wherein the directional signals include turn signals.

8. The system of claim 6, wherein the controller varies the illuminating schemes of the light sources based on a pace of a moving wearer in comparison with a prescribed targeted pace, to indicate the rate of travel of the wearer relative to the targeted pace, wherein the targeted pace can vary based on the wearer's location, and the pace of the wearer is determined via the positional data.

9. The system of claim 6, wherein the controller varies the illuminating schemes of the light sources based on the wearer decelerating at a rate that exceeds a prescribed maximum deceleration rate, for providing a warning to others, wherein the deceleration rate of the wearer is determined via the positional data.

10. The system of claim 6, wherein the controller varies the illuminating schemes of the light sources based on a prescribed distance between the wearer and an approaching intersection, as determined via the positional data, to provide a warning to the wearer and others.

11. A system for displaying information through light sources comprising:
   a wearable;
   light sources disposed on the wearable;
   a controller in communication with said light sources; and
   a software application that runs on an external device in wireless communication with the controller, the software application is configured to control the light sources with or without direct user input, such that the software application can vary the illuminating schemes of the light sources based on positional data, providing location, speed, and direction of movement of a wearer relative to map data; and
   a battery attached to said controller.

12. The system of claim 11, wherein the software application is in communication with a GPS receiver that is used to track the positional data.

13. The system of claim 11, wherein the external device is a smartphone.

14. The system of claim 13, wherein the software application can vary the illuminating schemes of the light sources based on calls and texts received by the smartphone.

15. The system of claim 11, wherein said application stores user data for computing information.

16. The system of claim 11, wherein the map data includes travel routes and intersection locations.

17. The system of claim 16, wherein the software application can vary the illuminating schemes of the light sources based on a pre-determined travel route compared to the positional data, such that the illuminating schemes 1) convey directions to a wearer, and 2) convey predicted directional signals to others, wherein the directional signals include turn signals.

18. The system of claim 16, wherein the software application varies the illuminating schemes of the light sources based on a pace of a moving wearer in comparison with a prescribed targeted pace, to indicate the rate of travel of the wearer relative to the targeted pace, wherein the targeted pace can vary based on the wearer's location, and the pace of the wearer is determined via the positional data.

19. The system of claim 16, wherein the software application varies the illuminating schemes of the light sources based on the wearer decelerating at a rate that exceeds a prescribed maximum deceleration rate, for providing a warning to others, wherein the deceleration rate of the wearer is determined via the positional data.

20. The system of claim 16, wherein the software application varies the illuminating schemes of the light sources based on a prescribed distance between the wearer and an approaching intersection, as determined via the positional data, to provide a warning to the wearer and others.

* * * * *